United States Patent
Burke et al.

(10) Patent No.: US 12,124,254 B2
(45) Date of Patent: Oct. 22, 2024

(54) METHOD FOR PREDICTIVE MAINTENANCE OF A MANUFACTURING SYSTEM BASED ON LATENT PROPERTIES

(71) Applicant: Arch Systems Inc., Mountain View, CA (US)

(72) Inventors: Timothy Matthew Burke, Mountain View, CA (US); Andrew Galen Scheuermann, Mountain View, CA (US); Swamy Muddu, Mountain View, CA (US)

(73) Assignee: Arch Systems Inc., Palo Alto, CA (US)

( * ) Notice: Subject to any disclaimer, the term of this patent is extended or adjusted under 35 U.S.C. 154(b) by 189 days.

(21) Appl. No.: 17/845,449

(22) Filed: Jun. 21, 2022

(65) Prior Publication Data
US 2022/0317679 A1 Oct. 6, 2022

Related U.S. Application Data

(62) Division of application No. 17/393,966, filed on Aug. 4, 2021, now Pat. No. 11,397,427.
(Continued)

(51) Int. Cl.
*G05B 23/02* (2006.01)
*G01M 99/00* (2011.01)

(52) U.S. Cl.
CPC ....... *G05B 23/0283* (2013.01); *G01M 99/005* (2013.01)

(58) Field of Classification Search
None
See application file for complete search history.

(56) References Cited

U.S. PATENT DOCUMENTS

| 7,907,267 B2 | 3/2011 | Spalding |
| 8,838,510 B2 | 9/2014 | Baughman et al. |
| | (Continued) | |

FOREIGN PATENT DOCUMENTS

| CN | 116075798 A | 5/2023 |
| EP | 4193236 A1 | 6/2023 |
| | (Continued) | |

OTHER PUBLICATIONS

Bello, Juan Pablo, "Periodicity section", https://www.docsity.com/en/music-information-retrieval-lecture-slides-periodicity-literature/47440/, New York University, Lecture slides, uploaded on Jan. 25, 2012.
(Continued)

*Primary Examiner* — Bernard G Lindsay
(74) *Attorney, Agent, or Firm* — Jeffrey Schox; Samuel Rosenthal

(57) ABSTRACT

A system for predictive analysis and/or process control, preferably including one or more communication and/or computing systems, and optionally including one or more entities and/or sensors. A method for predictive analysis and/or machine operation, preferably including receiving entity data and determining one or more latent features, and optionally including determining one or more response reconstructions, determining a processed representation of the entity data, determining entity information, and/or acting based on entity information. In some embodiments, the method can additionally or alternatively include: determining segments, identifying one or more state change event occurrences, determining an event data subset based on the state change event occurrences, generating a response reconstruction using the event data subset, selecting a physical simulation, selecting one or more simulation hyperparameters for the physical simulation, running the physical simu-
(Continued)

lation, and/or extracting one or more latent features from the physical simulation.

17 Claims, 9 Drawing Sheets

Related U.S. Application Data

(60) Provisional application No. 63/060,971, filed on Aug. 4, 2020.

(56) References Cited

U.S. PATENT DOCUMENTS

| | | | |
|---|---|---|---|
| 11,397,427 B2 * | 7/2022 | Burke | G05B 23/0283 |
| 2002/0127861 A1 | 9/2002 | Wang et al. | |
| 2006/0200035 A1 | 9/2006 | Ricci et al. | |
| 2006/0293780 A1 * | 12/2006 | Chang | G05B 19/41875 |
| | | | 700/121 |
| 2008/0145521 A1 * | 6/2008 | Guo | H01L 31/18 |
| | | | 118/301 |
| 2012/0078670 A1 | 3/2012 | Yamamura et al. | |
| 2015/0077263 A1 * | 3/2015 | Ali | G05B 23/0216 |
| | | | 340/679 |
| 2015/0235139 A1 | 8/2015 | Sharma et al. | |
| 2015/0293531 A1 * | 10/2015 | Mikami | G05B 23/0235 |
| | | | 702/182 |
| 2017/0030349 A1 | 2/2017 | Bassett et al. | |
| 2017/0178030 A1 | 6/2017 | Pal | |
| 2018/0268050 A1 | 9/2018 | Kotorov et al. | |
| 2018/0284758 A1 | 10/2018 | Cella et al. | |
| 2018/0348741 A1 | 12/2018 | Maenosono et al. | |
| 2019/0188797 A1 | 6/2019 | Przechocki et al. | |
| 2019/0339688 A1 | 11/2019 | Cella et al. | |
| 2019/0354914 A1 | 11/2019 | Nicholas | |
| 2019/0356849 A1 | 11/2019 | Sapienza et al. | |
| 2020/0067789 A1 | 2/2020 | Khuti et al. | |
| 2020/0067969 A1 * | 2/2020 | Abbaszadeh | G06N 20/10 |
| 2020/0104676 A1 | 4/2020 | Rehman | |
| 2020/0167640 A1 | 5/2020 | Sundareswara et al. | |
| 2020/0174463 A1 | 6/2020 | Cella et al. | |
| 2020/0210824 A1 | 7/2020 | Poornaki et al. | |
| 2020/0244594 A1 | 7/2020 | Yoneda | |
| 2020/0304729 A1 | 9/2020 | Runia et al. | |
| 2020/0379020 A1 | 12/2020 | Koumoto | |
| 2021/0304321 A1 | 9/2021 | Przechocki et al. | |
| 2022/0043439 A1 | 2/2022 | Burke et al. | |
| 2022/0043440 A1 | 2/2022 | Burke et al. | |
| 2022/0317679 A1 | 10/2022 | Burke et al. | |
| 2023/0058122 A1 | 2/2023 | Lee | |

FOREIGN PATENT DOCUMENTS

| | | |
|---|---|---|
| JP | H07167688 A | 7/1995 |
| WO | 2017083148 A1 | 5/2017 |
| WO | 2022031833 A1 | 2/2022 |

OTHER PUBLICATIONS

Subramaniam, S., et al., "Online Outlier Detection in Sensor Data Using Non-Parametric Models", VLDB '06, Sep. 12-15, 2006, Seoul, Korea.

Fiori, et al., "ECG waveforms reconstruction based on equivalent time sampling", IEEE International Symposium on Medical u Measurements and Applications (MeMeA) Jun. 1, 2020 (pp. 1-6), IEEE.

* cited by examiner

METHOD FOR PREDICTIVE MAINTENANCE OF A MANUFACTURING SYSTEM BASED ON LATENT PROPERTIES

CROSS-REFERENCE TO RELATED APPLICATIONS

This application is a Divisional of U.S. application Ser. No. 17/393,966, filed 4 Aug. 2021, which claims the benefit of U.S. Provisional Application Ser. No. 63/060,971, filed on 4 Aug. 2020, each of which is incorporated in its entirety by this reference.

TECHNICAL FIELD

This invention relates generally to the data analysis field, and more specifically to new and useful systems and methods for predictive analysis and/or process control in the data analysis field.

BACKGROUND

Conventional systems and methods for predictive analysis and/or process control (e.g., predictive maintenance) generally predict that a machine is failing based on failure data from sensors on the machine, wherein the prediction can be used by a technician to fix the machine before failure. Therefore, although such systems and method may collect a large amount of condition monitoring data, this data may include only a few examples of failure. Thus, there is a need in the data analysis field for new and useful methods and systems for predictive analysis and/or process control, such as those that can be employed even in the absence of large amounts of failure data.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
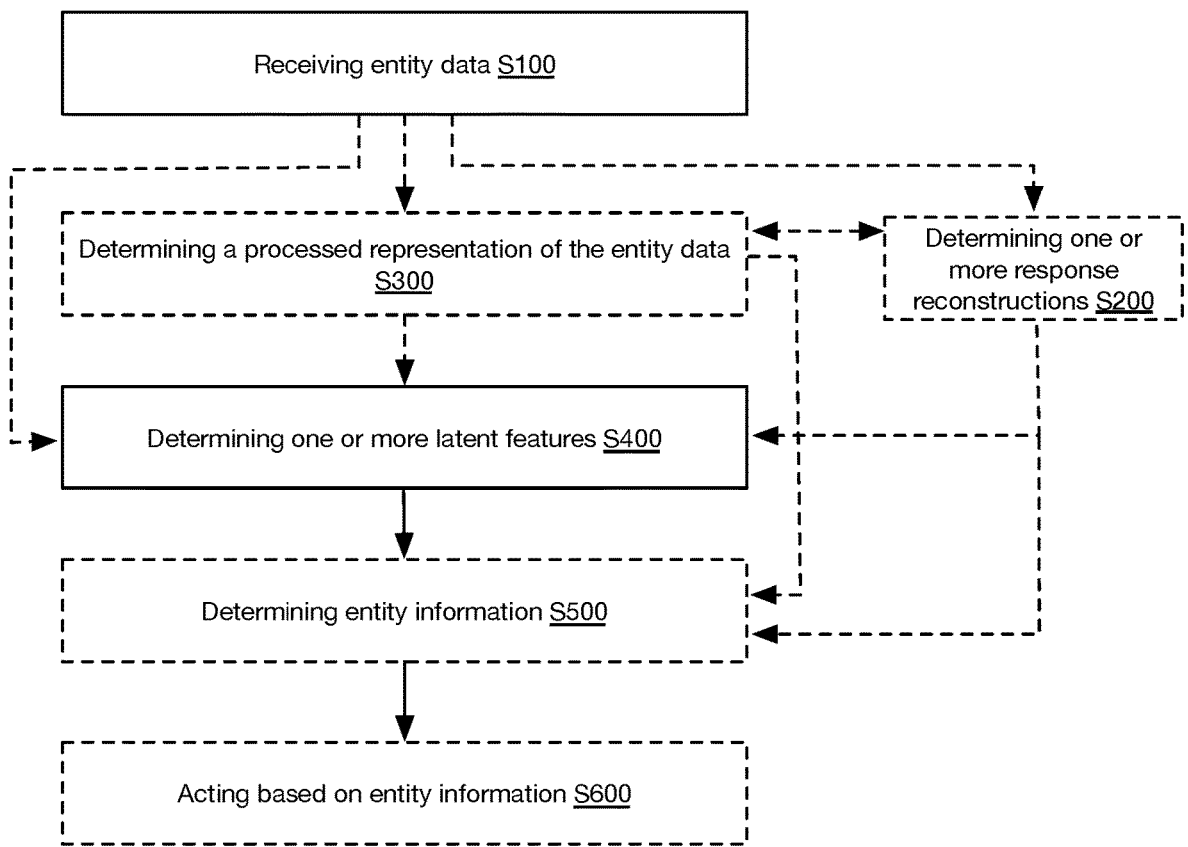
FIG. 1 is a schematic representation of a method.

As shown in FIG. 1, a method 10 for predictive analysis and/or process control preferably includes receiving entity data S100 and determining one or more latent features S400. The method can optionally include determining one or more response reconstructions S200, determining a processed representation of the entity data S300, determining entity information S500, and/or acting based on entity information S600, and/or can additionally or alternatively include any other suitable elements.

Figure 3:
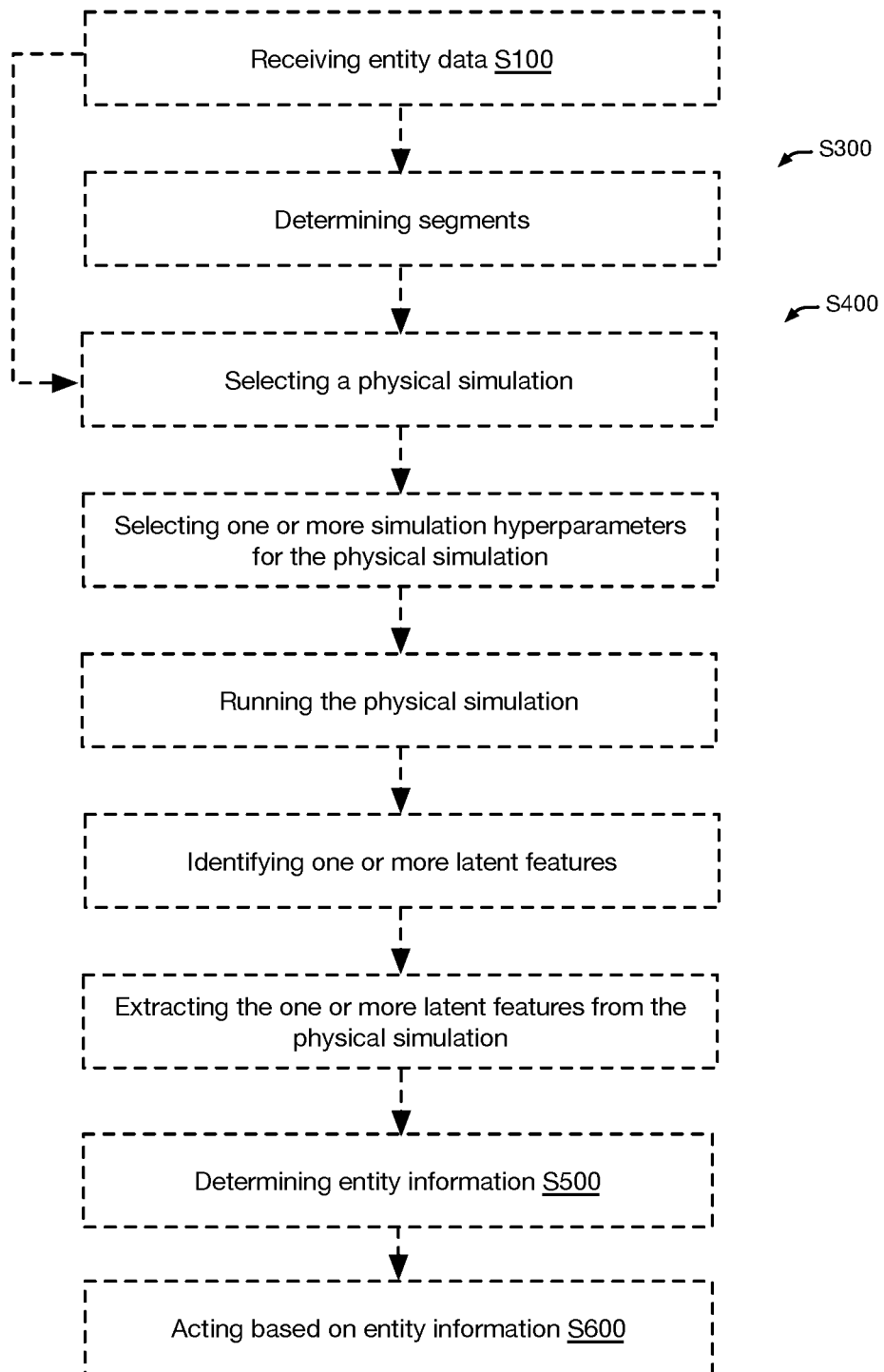
FIG. 3 is a flowchart representation of an embodiment of the method.

In some embodiments, the method can include: receiving entity data; determining segments; selecting a physical simulation; selecting one or more simulation hyperparameters for the physical simulation; running the physical simulation; identifying one or more latent features; extracting the one or more latent features from the physical simulation; determining entity information; and/or acting based on entity information (e.g., performing maintenance, altering process conditions, etc.), such as shown by way of example in FIG. 3).

Figure 4:
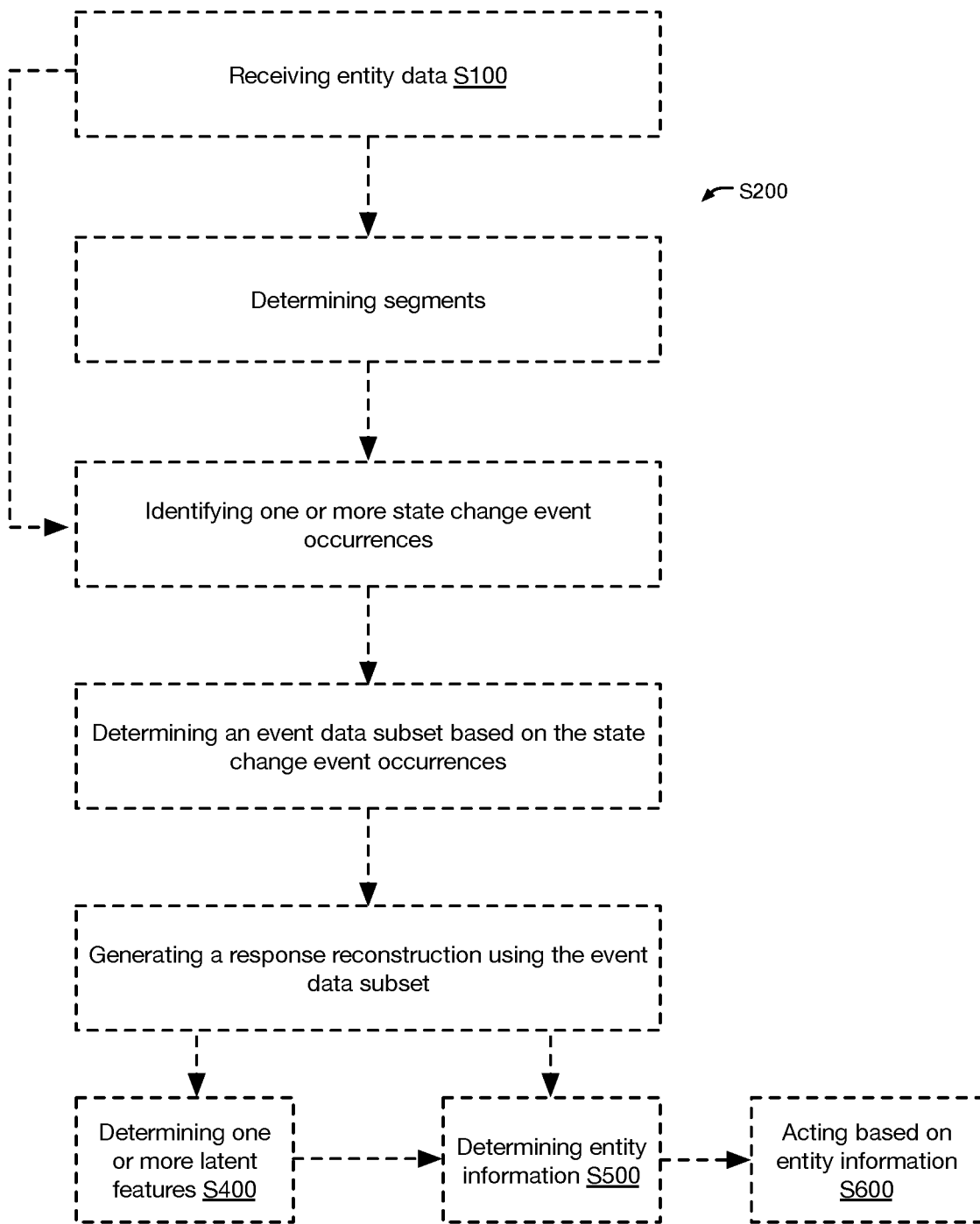
FIG. 4 is a flowchart representation of an embodiment of the method.

In some embodiments, the method can include: receiving entity data; determining segments; identifying one or more state change event occurrences; determining an event data subset based on the state change event occurrences; generating a response reconstruction using the event data subset; determining one or more latent features; determining entity information; and/or acting based on entity information (e.g., performing maintenance, altering process conditions, etc.), such as shown by way of example in FIG. 4).

Figure 2:
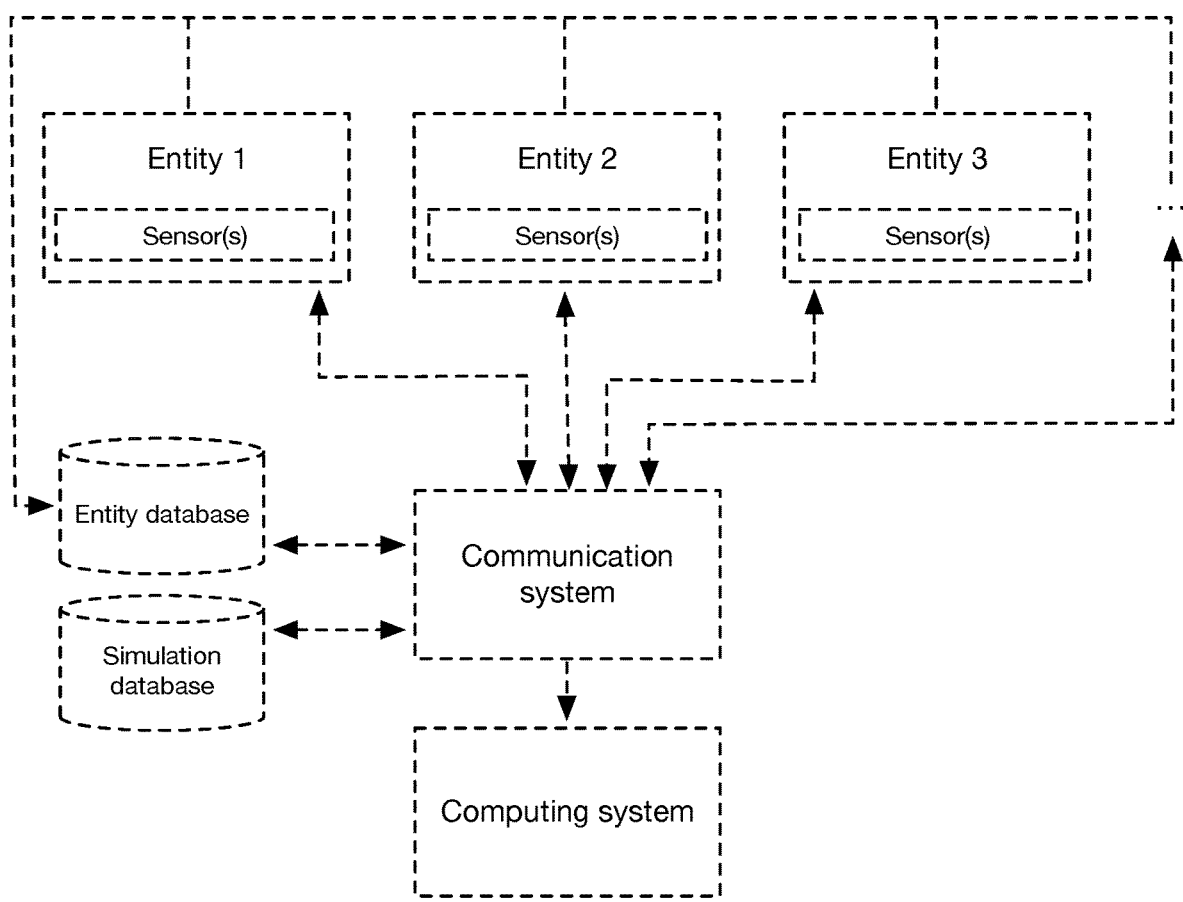
FIG. 2 is a schematic representation of a system.

A system 20 for predictive analysis and/or process control can include one or more communication systems, one or more computing systems, and/or any other suitable components (e.g., as shown in FIG. 2). The system can include and/or be used with one or more one or more entities (e.g., machines, components, etc.), one or more sensors, and/or any other suitable components. For example, the system can include and/or be associated with elements of a manufacturing system (e.g., system configured to manufacture, process, and/or otherwise create and/or modify one or more products). The method is preferably performed by the system, but can additionally or alternatively be performed by any other suitable system(s).

2. Examples

In a first example, the system and/or method can combine sensor data (e.g., time series sensor data) from one or more machines, testing and/or inspection tools, manufacturing lines, factories, and/or other entities with a physical model or simulation of the entity operation to identify derivative values based on (e.g., multivariate combinations of) one or more measured variables that may influence and/or relate to the process via a physical mechanism, and hence may exhibit continuity and/or monotonicity in their effects on the machine (e.g., as described below in S400). This can enable computation of a safe (and/or unsafe) operating region for latent features in a tractable way (e.g., based on clustering; defined within a threshold distance of an average value, such as within a threshold number of standard deviations from a mean, such as within 1 sigma of the mean in a specific example; etc.), which can be used, for example, to identify machines that are within a safe operating zone (e.g., far from any known boundary of the safe operating zone), and therefore are expected not to fail (e.g., within a threshold time period, with less than a threshold failure probability, etc.). Furthermore, since the system and/or method preferably determine latent features that are physically motivated (e.g., and hence also continuous), derivatives (e.g., time derivatives) of such latent feature are typically also continuous. Latent feature derivatives can be used, for example, to define a hyper-velocity for the latent features and compute the speed at which a given machine is trending out of the safe zone and/or into an unsafe zone, in order to predict when the machine is likely to be risky (e.g., higher risk of machine failure, product/process imperfections, etc.) and/or in order to determine when to intervene in machine operation, such as by altering process conditions and/or by performing maintenance of the machine (e.g., as described below in S500).

In a first specific example, the system and/or method can function to enable tracking of solder paste printer condition (e.g., for a solder paste printer than includes a squeegee that presses solder paste through a stencil). For example, the sensor data can include one or more of: squeegee speed, pressure applied by the squeegee, temperature (e.g., solder paste temperature), and/or humidity (e.g., solder paste humidity). Squeegee speed and/or applied pressure can be used (e.g., along with information related to the stencil, such as orifice sizes and/or shapes) to model solder paste viscosity, which can be indicative of solder paste quality. Temperature and/or humidity can optionally be used to increase accuracy of mapping solder paste viscosity to quality (e.g., wherein some changes in viscosity may be related to changes in temperature and/or humidity, and so after correction for these changes, some or all remaining viscosity changes may be attributed to changes in paste quality). In response to a decrease in solder paste quality (e.g., below a threshold, at more than a threshold rate of decrease, etc.), the method may include changing process parameters to accommodate reduced paste quality, and/or performing maintenance such as replacing the solder paste. Additionally or alternatively, the data can include data associated with stencil cleaning rates (e.g., number of boards printed between stencil cleaning cycles, time between stencil cleaning cycles, etc.; descriptive statistics and/or derived values associated therewith, such as averages, etc.), which can be indicative of stencil health (e.g., wherein high and/or increasing stencil cleaning rates may be indicative of poor stencil health and/or a need to replace or repair the stencil).

In a second specific example, the system and/or method can function to enable tracking of the condition of a PNP machine element (e.g., nozzle, feeder, etc.). For example, the sensor data can include one or more pressures (e.g., characteristic pressure such as average or maximum pressure, time series of pressure data, etc.) for pick up and/or placement of each component, and/or can include data associated with lateral displacements (e.g., position adjustments applied to a downstream PNP machine element, such as based on optical monitoring, in order to correct for position deviations caused by the PNP machine element in question). Over the course of picking and placing many components, these pressures and/or lateral displacements can define one or more distributions for each data type (e.g., a separate distribution for each component type, shape, and/or size; shared distributions for groups of one or more similar component types, shapes, and/or sizes, such as wherein components of similar size and shape are binned into a single distribution; etc.). These one or more distributions can be characterized (e.g., based on descriptive statistics, using a kernel density such as described below in more detail, etc.), and changes in the distributions (e.g., wherein measurements are binned together into distributions by sampling time, and the distributions arising from different sampling time bins can be compared with each other) can be tracked based on changes in the characteristics (e.g., mean, width, etc.) determined. Such characteristics, and/or changes thereof, can be correlated with known defect rates associated with the PNP machine element, and can be used to inform changes to process parameters and/or to schedule or defer maintenance of the element.

In a second example, the system and/or method can include identifying "natural experiments" in time series data (e.g., wherein the time series data includes information that enables desired analysis, preferably wherein the information has been gathered during the natural course of system operation, such as without or with minimal user interference with the typical process conditions). Such identification can preferably enable enhancement of temporal resolution (e.g., as compared with the collected time series data) associated with events of interest. In a specific example, the system and/or method can function to enable tracking of valve health, and the data can include data associated with valve closure, such as upstream pressure and/or flow measurements. Since the flow and pressure do not provide information about the valve health directly, the system and/or method can use the flow and/or pressure measurements to track how the measurements respond after (e.g., immediately after) valve closure (e.g., settling time, overshoot, etc.). The measurements can provide physical details about the valve which can be compared to other valves to determine if a particular valve is similar or dissimilar to the other valves and track how the valve health changes over time.

Figure 6:
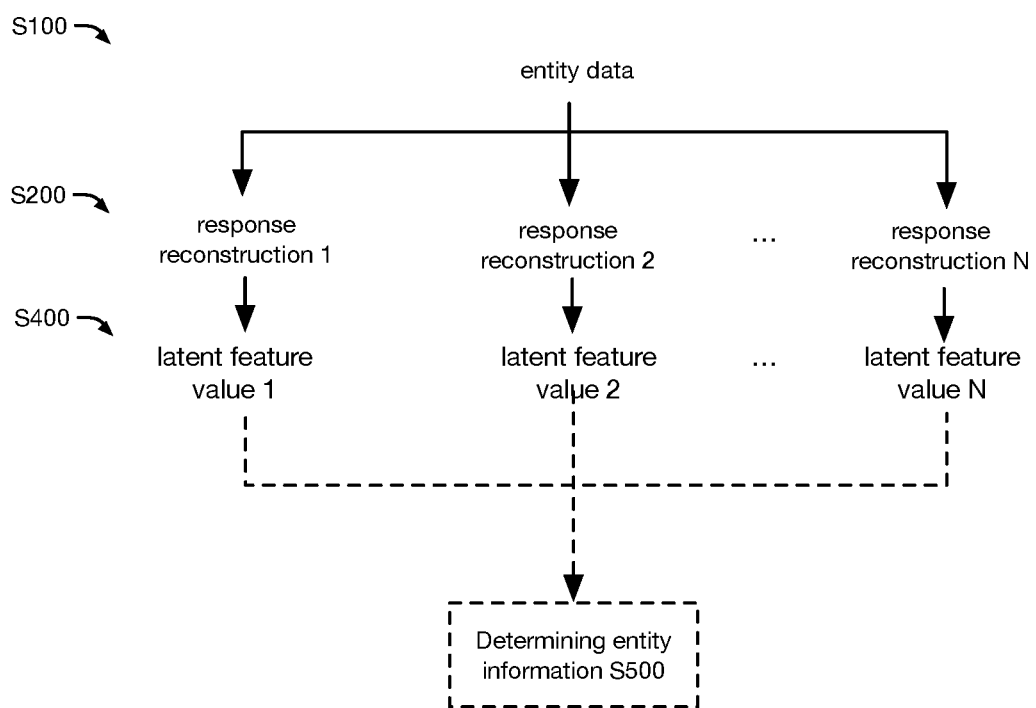
FIG. 6 is a schematic representation of an embodiment of the method.

However, in some variations of this example, sampling rates for the sensors of interest may be too low to temporally resolve the response to the stimulus. For example, the response can complete and the signal readings can substantially return to 'steady state' in just a few seconds (e.g., 1-2 seconds), whereas the sampling rate can be comparable to (e.g., substantially equal, only slightly shorter such as shorter by a factor of 2-3, slightly longer such as longer by a factor of 2-3, etc.) or significantly longer the response time (e.g., sampling every 10 seconds). For each response, one or more samples (of each variable) immediately following the response can be used for analysis. Since the response occurrence is typically uncorrelated with the sampling (e.g., stimuli that generate responses may occur at arbitrary times relative to the times at which samples are taken), accumulating samples during many similar or substantially identical responses (e.g., immediately following many similar stimuli) can function to determine data points at different times (e.g., relative to impulse occurrence) during the stimulus response (e.g., one data point per stimulus). Assuming that the response stays relatively constant (from occurrence to occurrence) over a sufficient amount of time (e.g., a time during which the stimulus occurs many times, thus allowing for the accumulation of many data points, without the response changing significantly), the system and/or method can build up a detailed signature from the accumulation of many measured responses to stimuli. Further, over longer time periods (e.g., during which the response may change significantly), the method can include building up several such signatures (e.g., one for each of several shorter time periods, during which the response does not change significantly, within this longer time period), and possibly tracking how the properties of that signature evolve, such as to predict when the machine is likely to be unsafe and/or risky (e.g., as described below in S200). Additionally or alternatively, in some embodiments, latent features can be extracted from the response reconstructions, and such latent features can be used to predict when the machine is likely to be risky (e.g., as shown in FIG. 6).

In a third example, the system and/or method include one or more elements of both the first and second examples described above. In a first specific example, the system and/or method can include increased temporal resolution associated with time series data (e.g., as described above regarding the second example), and then determining latent features based on the increased-resolution data (e.g., as described above regarding the first example). In a second specific example, the system and/or method can include determining latent features (e.g., as described above regarding the first example) based on time series data (e.g., as-collected data), and then increasing temporal resolution associated with one or more of the latent features (e.g., as described above regarding the second example).

3. Benefits

The system and/or method can confer several benefits over conventional systems.

First, variants of the method and system can enable deferral of maintenance for entities that are known and/or expected to be healthy, to not require maintenance soon, and/or otherwise in good condition (e.g., entity data from a particular entity associated with a safe zone).

Second, variants of the method and system can enable predictive maintenance and/or process control that can combine past historical sensor data from an entity with a physical model or simulation of the entity operation to identify latent features, preferably wherein the latent features and/or associated behavior is smooth and/or continuous (e.g., latent features associated with one or more physical mechanisms and/or otherwise having physical significance, and hence continuity in their effects on the entity).

Third, in variants of the method and system in which the latent features are continuous (e.g., since the latent features are physically motivated), a safe zone (e.g., operating region) associated with the latent features (e.g., a region within a space defined by the latent features) can be computed using tractable techniques.

Figure 7A:
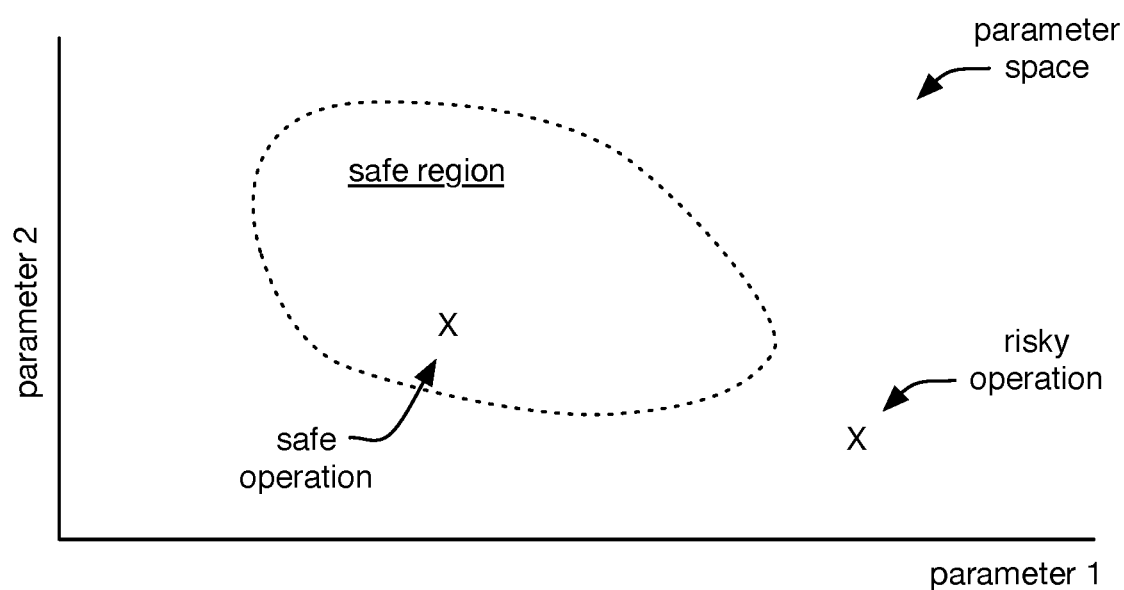
FIGS. 7A-7B are schematic representations of examples of zones and operation points within a parameter space.
Figure 7B:
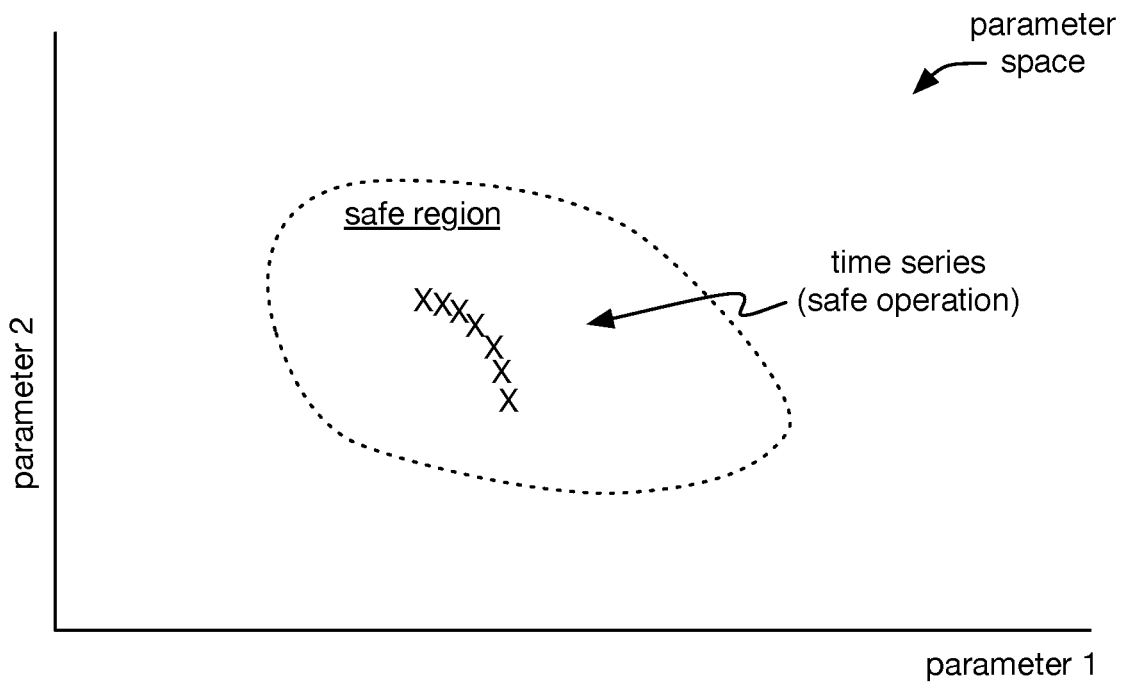
Figure 7C:
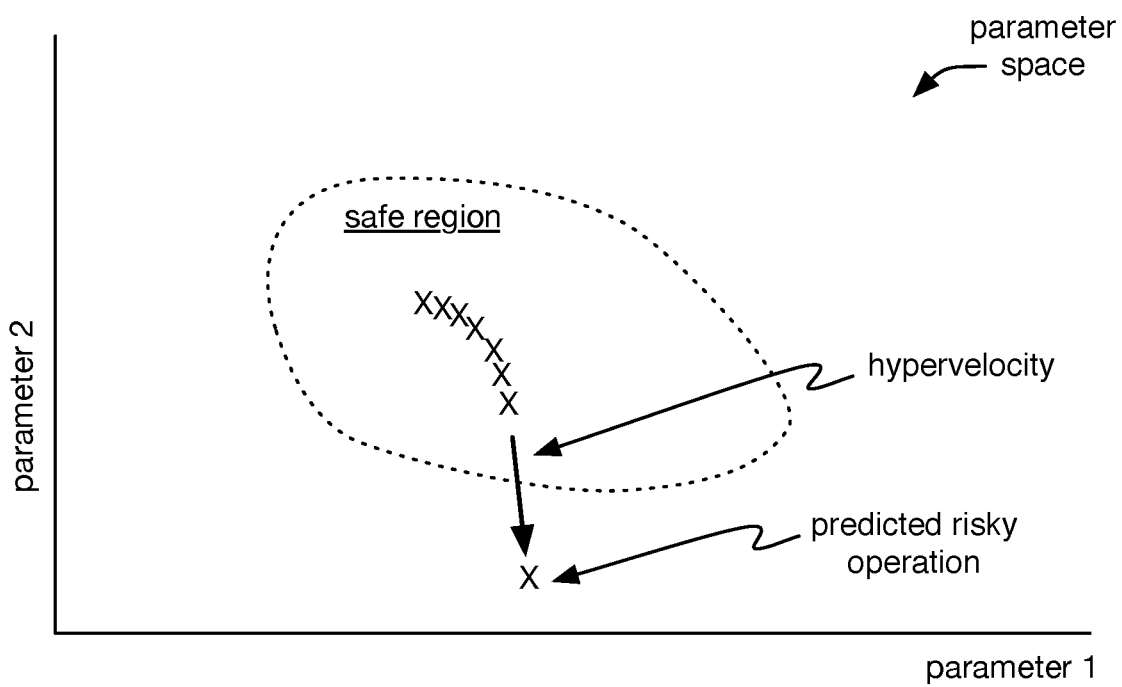
FIG. 7C is a schematic representation of an example of a hypervelocity within a parameter space.

Fourth, in variants of the method and system in which some or all of the latent features are physically motivated, these features' derivatives (e.g., time derivatives) are typically continuous, thereby enabling the system and/or method to determine a hyper-velocity of machine performance within the latent parameter space, and thus to compute, for example, a speed at which a particular machine or process is trending out of a safe zone (e.g., as shown in FIG. 7C). Such information can be used, for example, in order to predict when that machine or process is likely to be unsafe (e.g., risky, such as at risk of machine failure and/or of causing product and/or process imperfections, etc.) and/or in order to optimally schedule maintenance of the machine (e.g., reducing premature maintenance while still avoiding machine failure) and/or implement changes in process parameters.

Fifth, variants of the system and/or method can include aggregating samples of multiple event occurrences within a signal to determine a response reconstruction (e.g., entity response) that could not otherwise be determined, such as due to a sampling rate that is slower than (or not sufficiently faster than) the entity settling rate (e.g., time at which the signal returns to average operation values).

However, the method and system can confer any other suitable benefits.

4. System

The system for predictive analysis and/or process control can include one more communication systems (e.g., APIs, Wi-Fi radios, cellular radios, Bluetooth radios, courier devices, such as user devices and/or storage media, network connections such as LAN and/or WAN connections, etc.), computing systems (e.g., integrated into the entity, remote computing system, etc.), and/or any other suitable components.

The system can include and/or be used with one or more one or more entities (e.g., machines, components, etc.), one or more sensors, one or more variables, and/or any other suitable components or elements.

The one or more entities are preferably mechanical systems, such as systems that perform a predefined set of tasks. The entities can include one or more machines (e.g., etch machines, diffusion machines, evaporation machines, deposition machines, printed circuit board (PCB) assembly and/or inspection machines, etc.), one or more components (e.g., pipes, motors, pedals, manifolds, chambers, pumps, chillers, air purifiers, switches, actuators, etc.), entity control systems (e.g., that control machine or component operation), and/or any other suitable entities. The one or more components can be associated with one or more machines, can be separate from any machines, and/or can have any other suitable relationship with the machines, other components, and/or other entities of the system.

The one or more sensors that monitor entity operation can include M sensors, wherein M can be 1, 2, 3, 4, 10, 20, 30, 5-10, 10-20, 20-30, 30-50, 50-100, 100-200, 200-500, 500-1000, more than woo, and/or any other suitable number of sensors. Each sensor can optionally be associated with an entity (e.g., the same entity, different entities, etc.) and/or multiple entities. The sensors can include accelerometers, gyroscopes, inertial measurement units (IMUs), magnetometers, altimeters, touchscreens, light sensors such as optical sensors and/or X-ray sensors, pressure sensors, flow sensors, Hall effect sensors, electrical characteristic sensors such as voltage meters, capacitance meters, resistance meters, current meters, continuity sensors, etc., inductive sensors, capacitive displacement sensors, laser sensors, confocal sensors, GPS receivers, cameras, microphones, and/or any other suitable sensors.

The one or more sensors can sample, transmit, and/or store data at a sampling rate (e.g., the same rate, different rates, etc.), such as to determine signals. The sampling rate can be low (e.g., sampling every 5, 10, 15, 20, 30, 60, 5-10, 10-20, 20-30, and/or 30-60 s, etc., or sampling less frequently than once every 60 s), high (e.g., sampling 1, 2, 5, 10, 20, 50, 100, 200, 500, 1000, 1-3, 3-10, 10-30, 30-100, 100-300, and/or 300-1000 times per second, etc., or sampling more frequently than 1000 times per second), and/or have any other suitable rate; in some examples, the rate can be adjusted (e.g., adjusted in a predetermined manner, adjusted dynamically, adjusted in response to one or more events and/or determinations, etc.), such as wherein a sampling rate (e.g., periodic sampling rate) is adjusted based on triggers, and/or otherwise controlled. Sampling can be performed regularly (e.g., periodically, such as with uniform timing), sporadically, in response to triggers (e.g., wherein one or more samples are taken in response to each trigger), and/or sampling can be performed with any other suitable timing. The data sampled from the one or more sensors can be stored for each sampled value (and/or cached and subsequently stored), stored in response to detecting a change (e.g., change greater than a threshold, such as a predetermined or dynamic threshold) between samples (e.g., such that the sampling rate may be high, but the stored data is sparser as it may include only timepoints at which the value has changed or changed by more than the threshold), and/or stored based on any other suitable criteria (e.g., wherein all sampled data is stored, wherein only a subset thereof is stored, etc.). In some examples in which the data is not sampled with uniform timing, the data may be resampled (and/or stored and/or analyzed in a manner similar to resampling) into a uniform or substantially uniform timing representation (e.g., before and/or during storage, during and/or after retrieval from storage, etc.), such as by use of a Lomb-Scargle periodogram. However, the data can additionally or alternatively be sampled and/or stored in any other suitable manner.

The system can be associated with one or more variables (e.g., physical parameters) that can function to associate measurement data with meaning. The variables can include, in examples: current, temperature, speed, pressure (e.g., inlet, outlet, etc.), vibration, gas flow rates, state (e.g., open or closed, % open, etc.), duration, position (e.g., angular position, linear position, etc.), displacement (e.g., actual position compared to an expected or desired position), torque, stress, load, work, and/or any other suitable variable, as well as derivatives thereof (e.g., derivatives with respect to time, with respect to one or more spatial dimensions, etc.). The variables can be measured by the one or more sensors, simulated, and/or otherwise determined. The variables are preferably common to multiple entities. The variables can additionally or alternatively include any other suitable elements.

In one variation, the entities include one or more printed circuit board (PCB) assembly and/or inspection machines (e.g., the entities include a surface-mount technology (SMT) PCB manufacturing line, including a plurality of assembly and inspection machines). In this variation, the entities can include PCB assembly machines such as pick-and-place (PNP) machines, solder printers, ovens, and/or elements thereof; PCB inspection machines such as optical and/or X-ray inspection tools (e.g., automated optical inspection (AOI) and/or automated X-ray inspection (AXI) machines), solder paste inspection (SPI) tools, in-circuit test tools; and/or any other suitable entities. The PCB assembly machine elements can include one or more PNP elements, such as placement heads, nozzle holders on placement heads, nozzles attached to nozzle holders, cameras (e.g., cameras associated with nozzle holders, which can be used to detect part placement on nozzle holders; separate cameras such as "flying" cameras associated with placement heads, which can be used to detect panel placement, warpage, and/or other attributes; etc.), feeders, component reels, vacuum pumps and/or feeds, and the like.; solder printer elements, such as stencils, squeegees, cameras (e.g., for inspecting board position and/or registering board position with stencil position), and the like; and/or any other suitable elements.

However, the system can additionally or alternatively include and/or be used with any other suitable components or elements.

5. Method

The method for performing predictive analysis and/or process control preferably includes receiving entity data S100, optionally determining one or more response reconstructions S200, optionally determining a processed representation of the entity data S300, determining one or more latent features S400, and optionally determining entity information S500, but can additionally or alternatively include any other suitable elements.

The method is preferably performed by the system, but can additionally or alternatively be performed by any other suitable system. The method can be performed locally at the entity (e.g., when the entity includes a computing system), can be performed at a remote computing system, at a user device, and/or at any other suitable computing system. The method can be performed using entity data that can include training data and/or inference data, wherein the training data can be used to determine the classification techniques of the method which can be used to evaluate the inference data. However, the distinction between training data and inference data need not be made.

5.1 Receiving Entity Data S100.

The method preferably includes receiving entity data S100, which can function to receive past historical data associated with (e.g., sampled by and/or from) one or more similar entities (e.g., entities related by entity type, facility, any other shared characteristic, etc.). The data preferably includes time series data (e.g., one or more series of values sampled over time, and preferably stored in association with timing information, such as timestamps, time steps between values of the series, etc.), but can additionally or alternatively include spatiotemporal data and/or any other suitable data.

The entity data can include training data (e.g., data used to determine the one or more classification techniques in S400) and inference data (e.g., data that is classified by the one or more classification techniques in S400). The training data and inference data can be received simultaneously, consecutively, successively, and/or otherwise received.

The entity data preferably includes signals (sensor measurements), measurement times, and/or any other suitable information. For example, the entity data can include data indicative of one or more physical properties (and/or other variables, such as those described above regarding the system) associated with operation of the system and/or one or more associated entities (e.g., one physical property or a plurality of physical properties associated with a manufacturing system).

The entity data can be associated with metadata which can include, in examples, information associated with (e.g., indicative of): entity replacement events (e.g., time associated with an entity replacement, which can occur due to entity failure, due to failures unrelated to the entity such as water leaks, electrical wiring issues, based on heuristics; can occur due to time-based proactive replacement; etc.), state change events (e.g., state change of an entity such as on/off, open/close, change in operation settings, etc.), health check events, entity characteristics (e.g., machine and/or component type, model, settings, dimensionality, capacity, etc.), entity identifier, facility identifier, sensor identifier, variable, and/or any other suitable metadata. The metadata can be received separately from the entity data (e.g., received as a query result in response to querying a datastore, determined by a data processing module, etc.), can be received with the entity data (e.g., the entity data can be labelled with the metadata), and/or otherwise received.

The entity data can include a signal from a single entity, one or more signals from each of the one or more entities, signals from each of the M sensors (or a subset thereof) of each of the one or more entities, and/or any other suitable signals.

The entity data can be received from the entity, such as using the communication system; received from storage, such as received from an entity database as a query result (e.g., after querying the entity database for the data); sampled directly (e.g., by one or more sensors of and/or associated with the system); and/or otherwise received.

The entity data can be received in batches (e.g., after a predetermined time frame, after a batch capacity is above a predetermined threshold, etc.), streamed (e.g., real-time, near real-time etc.), and/or otherwise received.

In one embodiment, in which the entities include one or more PCB assembly and/or inspection machines, the physical properties can include one or more of: component (e.g., SMT component) position and/or offset from desired position (e.g., relative to a PCB and/or features thereon), such as distance (e.g., from desired position), position along one or more lateral axes (e.g., displacement from desired position, such as x & y offset), angular alignment or misalignment, and the like (e.g., determined based on AOI and/or AXI measurements); solder paste volume, location (e.g., displacement from desired position, such as x & y offset), dimensions (e.g., width, length, height, etc.), and the like (e.g., determined based on SPI measurements); electrical properties such as capacitance, resistance, and/or inductance of one or more components or circuit portions, voltage (e.g., under particular circuit inputs) at one or more circuit nodes, and the like (e.g., determined based on in-circuit test measurements); and/or any other suitable physical properties.

However, receiving entity data can additionally or alternatively include any other suitable elements.

5.2 Determining One or More Response Reconstructions S200.

The method optionally includes determining one or more response reconstructions S200, which can function to merge data associated with multiple occurrences of an event (e.g., state change event), such as to determine an aggregate response reconstruction. A response reconstruction preferably represents an entity's response (e.g., a spike, dip, and/or other transient in a measured signal, typically followed by a subsequent return to 'steady state' operation, such as steady state operation represented by sensor readings within a typical band and/or within a threshold range of average sensor readings of the sensor for the current operation state) to a state change event, but can additionally or alternatively represent any other suitable "motif" (e.g., repeating or substantially repeating feature) in the time-dependent behavior of one or more physical properties (e.g., measured properties, such as properties of the received entity data; latent properties, such as one or more of those determined in S400; etc.). A response reconstruction preferably includes a time series including a set of points representative of the motif; for example, the set of points can be associated with the period after a state change event, preferably continuing until the signal has returned (or substantially returned) to a 'steady state' condition (e.g., includes samples that are within a predetermined range of 'steady state' values, such as average or typical value ranges) or until the motif has otherwise ended.

S200 can optionally include determining the presence of the motif in the time-dependent behavior of the one or more physical properties (e.g., in the sampled and/or received data). The presence of the motif can be determined based on the data (e.g., detecting the motif within the data, such as by detecting a similar characteristic shape in portions of the time series, by detecting high auto-correlation within the time series, etc.), can be determined and/or expected based on metadata (e.g., indications of a particular process recipe being run, of particular process conditions repeating, etc.), determined based on external information (e.g., received from an external entity), and/or determined in any other suitable manner.

Determining a response reconstruction can optionally include determining segments, which can function to split data (e.g., the entity data) into chunks associated with particular entities (e.g., wherein each segment is representative of data sampled in association with a different entity) and/or with particular time windows of entity operation (e.g., wherein a plurality of the segments are representative of data sampled in association with the same entity, such as data sampled at different times). The segments can be determined based on the metadata (e.g., based on replacement event occurrences). In examples: a response reconstruction can be determined based on a single segment; multiple initial response reconstructions can be determined, each based on a different single segment, and all (or a subset thereof) of the initial response reconstructions can be used to determine a final response reconstruction; a response reconstruction can be determined based on multiple segments; and/or the segments can be otherwise used to determine one or more response reconstructions. The number of segments from which to determine a response reconstruction can be determined based on the metadata (e.g., number of maintenance and/or replacement event occurrences in a particular segment, number of maintenance and/or replacement event occurrences across multiple entities of the same type and/or model, etc.). The number of segments from which to determine a response reconstruction can be determined using heuristics, algorithms, rules, and/or using any other suitable process. Segments can be represented by segment labels, which may be used to extract segment data from the entity data based on the label (e.g., timestamps, entry numbers, etc.), can be represented by the entity data itself (e.g., splitting the entity data into segments), and/or the segments can be otherwise represented.

Determining a response reconstruction can be performed per signal of the entity data and/or per segment, but can additionally or alternatively be performed based on a combination of signals and/or segments (e.g., from the same entity, from different entities, etc.). Signals and/or segments can be processed in parallel and/or in series. The response reconstructions can be determined based on sampled and/or received data (e.g., entity data), based on other response reconstructions (e.g., response reconstructions determined as described herein, response reconstructions determined as described below regarding alternate embodiments, etc.), based on latent features (e.g., latent features determined such as described below regarding S400), and/or based on any other suitable information.

Determining a response reconstruction from the entity data can optionally include: identifying one or more state change event occurrences (e.g., motif occurrences); determining an event data subset based on the state change event occurrences; and generating a response reconstruction using the event data subset; but can additionally or alternatively include any other suitable elements performed using any other suitable processes.

Identifying one or more state change event occurrences can function to identify times of event occurrences that indicate a start of a response (e.g., triggered by a state change). The state change event occurrences can be identified using the time of the state change event occurrence determined using one or more metadata elements (e.g., time of state change event occurrence, such as a time at which an element of an entity was commanded or observed to change state), using a fiducial (e.g., a known feature in the data and/or metadata that is correlated with the state change event occurrences, and thus can be used to align the data), using heuristics, and/or using any other suitable technique.

In a first variant (e.g., when the state change event occurrence cannot be determined from the signal, when metadata that identifies the state change occurrence is available, etc.), the state change event occurrence can be identified using the metadata and/or heuristics. In a first example, a state change occurrence associated with a valve opening, closing, or other adjustment can be identified based on metadata associated with valve control. In a second example, a state change occurrence associated with activity during operation according to a particular process recipe can be identified based on metadata indicative of beginning operation according to the process recipe.

In a second variant, the state change event occurrence can be determined from the signal using manual labelling, automatic labelling (e.g., using one or more algorithms), and/or any other suitable identification process. In some examples, in which the entity data includes M signals, an event occurrence can be identified using one or more of the M signals, and the identification can be used to identify the event occurrence in the other signals.

Determining an event data subset based on the state change event occurrences can function to determine one or more subsets of points. The event data subset is preferably generated by sampling one signal (e.g., sampling a plurality of measurements of the signal over time) to generate a respective response reconstruction, but can additionally or alternatively be generated by sampling signals from entities of the same type, of the same model, from the same facility, and/or otherwise similar entities. The event data subset can include non-uniformly sampled points and/or uniformly sampled points. The event data subset is preferably used to generate the response reconstruction. Multiple event data subsets corresponding to multiple signals of the entity data can be used to generate respective response reconstructions and/or the multiple event data subsets can be used to generate the same response reconstruction. In some embodiments, determining an event data subset can include sampling one or more measurements (e.g., one measurement of a single signal, multiple measurements of a single signal, one or more measurements each of a plurality of signals, etc.) for each motif occurrence of a sequence of motif occurrences (e.g., for each state change event occurrence of the segment).

In a first variant, when the entity data includes one signal, determining an event data subset can include adding one or more subsequent samples (relative to the identified event occurrence) to the event data subset.

In a second variant, when the entity data includes multiple signals, the method can include determining multiple response reconstructions (one for each of the signals) by adding one or more subsequent samples of each signal to a respective event data subset. In a first example, each of these response reconstructions is determined independently (e.g., as described herein regarding determination of a single response reconstruction). In a second example (e.g., in which some or all of the signals are sampled at the same times, such as defining time series with identical or substantially identical timestamps), some or all of these response reconstructions are determined together (e.g., wherein a subsequent timestamp is selected, and, for each signal, the corresponding sample is added to the event data subset for that signal).

Generating a response reconstruction using the event data subset can function to build up a curve that represents the entity's response to a state change (e.g., by aggregating the measurements of the event data subset to define the response reconstruction). Generating a response reconstruction can include: aligning the points of the event data subset; determining a processed event data subset; combining the aligned points; and/or post-processing the combined points; but can additionally or alternatively include any other suitable elements performed using any other suitable process.

Generating a response reconstruction using the event data subset preferably includes aligning the points of the event data subset. Aligning the points can include, for each point, using an identified state change occurrence as a point's delay timestamp (e.g., to determine the amount of time, after the corresponding event, that the point was sampled). The point's delay timestamp can be determined based on the point's original timestamp (e.g., time at which the point was sampled) and the corresponding event timestamp (e.g., delay timestamp equal to a point's original timestamp minus the event timestamp).

The points to be aligned can be of the event data subset, the points of the processed event data subset (e.g., the processed event data subset can be determined before alignment), and/or any other points can be aligned.

In a first variant, aligning the points can include using one or more alignment algorithms (e.g., Lomb-Scargle periodogram, least-squares, etc.).

In a second variant, aligning the points can include re-sampling points of each event data subset to a uniform grid and using a correlation process to align the points (e.g., autocorrelation, cross-correlation, rank based correlation, etc.).

In a third variant, aligning the points can include aligning the points using similarity metric (e.g., F-distributed test statistic, hamming distance, etc.).

Generating a response reconstruction can include determining a processed event data subset, which can function to determine how much data to use for a single response reconstruction (e.g., 1 week, 2 weeks, 1 month, 2 months, less than 100 event occurrences, less than 300 event occurrences, less than 500 event occurrences, etc.); determine the multiplicity of response reconstructions (e.g., per day, per week, per month, per year, per less than 20 event occurrences, per less than 100 event occurrences, etc.). The amount of data to use can be determined based on noise, sparsity, time range, such as the length of the window defined by the points of the subset, indicia of response change over time (e.g., wherein a response that drifts significantly over the course of many event occurrences may require a shorter window, wherein a response with high stability may be amenable to the use of a longer window, etc.). The processed data can be determined using algorithms, heuristics, rules, and/or any other suitable process.

In some variants, data from a time window (e.g., predetermined window, dynamically-determined window, etc.) can be used to build a single response reconstruction. The windows can be contiguous, overlapping, separated by unused windows, and/or have any other suitable temporal relationships. If the window is too short of a range (e.g., too short of a time range, too few event occurrences), then the data may be sparse, which can result in a higher-noise response reconstruction (due to the use of fewer samples to create the curve, such as including fewer combined samples for each timepoint and/or including fewer timepoints). If the window is too long of a range then the response can have changed significantly over the course of the window, and so may not be valid for combination into a single response reconstruction (e.g., wherein such a response reconstruction could represent a "smeared" curve resulting from the combination of samples representative of different responses).

In a first example, the response may change slowly (e.g., but substantially monotonically) over the course of data collection. Accordingly, any combination of samples from multiple event occurrences, multiple days or weeks, etc., will likely exhibit some such "smearing". In the first example, the window is preferably selected to be short enough to reduce this effect, while still being long enough to include a sufficient number of samples in each reconstruction to generate a curve from which the behavior (and thus, the change in behavior between the reconstructions) can be observed.

In a second example, the response may change rapidly (e.g., substantially as a step change; changing over a short period of time, such as minutes, hours or days, relative to a total data collection time, such as weeks, months, or years). For example, behavior A can be exhibited in a particular period and behavior B can be exhibited in a subsequent period (wherein the behavior within each of these periods may also drift or remain stable over time). In the second example, the windows would ideally be selected such that this step change occurs at the boundary between windows (e.g., so that a first response reconstruction exhibits behavior A, and a second response reconstruction exhibits behavior B). However, it may not be feasible to identify the windows that result in such a division. Accordingly, when several windows are used to cover these two periods, some will preferably exhibit behavior A, others behavior B, and one window at the boundary will likely exhibit a "smeared" combination of the two. In some examples, the length and/or alignment of the windows can be iteratively refined and/or reselected (e.g., in order to achieve the desired performance).

Generating a response reconstruction using the event data subset can include combining the aligned points based on the updated timestamps, such as by reducing points associated with the same time or similar times (e.g., within a threshold temporal interval of each other) to a single point (e.g., averaging the point values, selecting the maximum point and/or minimum point value, selecting the median point value, etc.). Combining the aligned points can include slicing the response reconstruction into different time buckets, and then, for each time bucket, combining all points within the bucket. Additionally or alternatively, the points can be otherwise combined and/or partitioned.

Generating the response reconstruction can include post-processing the combined points based on the updated timestamps. Post-processing the aligned points can include using interpolation techniques (e.g., linear, polynomial, spline, etc.) on each of the event data subsets to estimate unknown points.

Post-processing the aligned points can additionally or alternatively include reducing noise in the aligned points using point binning (e.g., averaging adjacent points), smoothing filters (e.g., low pass filter, finite impulse response filter, etc.), deep learning techniques, and/or any other noise reduction techniques.

In alternate embodiments, S200 can additionally or alternatively include determining one or more response reconstructions in one or more alternate manners. These embodiments can include determining response reconstructions based on sampled and/or received data (e.g., entity data), based on other response reconstructions (e.g., response reconstructions determined as described above), based on latent features (e.g., latent features determined such as described below regarding S400), and/or based on any other suitable information.

In a first such embodiment, determining a response reconstruction can include computing a kernel density over a window of time in an input time series, wherein the computed kernel density can represent the response reconstruction and/or can be used to determine the response reconstruction (e.g., as described in Subramaniam, S., Palpanas, T., Papadopoulos, D., Kalogeraki, V., & Gunopulos, D. (2006, September). Online outlier detection in sensor data using non-parametric models. In *Proceedings of the 32nd international conference on very large data bases* (pp. 187-198), which is herein incorporated in its entirety by this reference). In some examples, S400 can include determining one or more latent features based on the computed response reconstruction(s). For example, one or more features (e.g., extrema, such as peaks) of this kernel density can optionally then be fit (e.g., by Gaussian curves) to determine one or more descriptive values associated with them (e.g., mean, width such as standard deviation, magnitude, etc.). In one example, a physical parameter associated with motor operation (e.g., electrical current drawn by the motor) can be used to determine a time series of response reconstructions such as described regarding this embodiment, each associated with a different time window. In this example, different peaks in the kernel density can be associated with different operation modes of the motor (e.g., a high current peak associated with motor startup, a lower-current peak associated with normal motor runtime, etc.), and changes in the latent parameters associated with these peaks can be indicative of changes in the operational state of the motor, such as changes that may indicate the need for current or future preventative maintenance (e.g., increase in current for normal motor runtime can indicate increased bearing resistance, which may require bearing maintenance or replacement).

In a second such embodiment, determining a response reconstruction can include extracting a periodic (or substantially periodic) component of a physical parameter signal (and/or determining one or more latent parameters associated with that periodic component), such as in situations in which the periodic component cannot be measured separately from one or more other components of the physical parameter signal (e.g., noise components, extrinsic factor components, etc.), which may obscure the periodic component. For example, the periodic component may be associated with operation of an entity that performs the same (or substantially the same) process cycle repeatedly, and one or more other components may be associated with operation of other entities and/or any other suitable signal sources. In this embodiment, the response reconstruction can be determined by accumulating (e.g., summing or averaging) the different cycles of the measured physical parameter signal, based on the periodicity of the periodic component. However, in some examples of this embodiment, the exact period and/or cycle start timing may be unknown (e.g., not available with sufficient fidelity and/or resolution from the sampled data, entity operation metadata, etc.). In such examples, determining the response reconstruction can include determining the period and/or cycle start timing offset based on auto-correlation of the signal (e.g., cross-correlation between different periods of the signal), such as wherein the cycle start timing offset is determined to maximize (or substantially maximize) cross-correlation between the different periods of the signal (once the timing offset is applied to appropriately align the periods of the signal). In some variations, the response reconstruction is determined such as described in "Periodicity detection", Juan Pablo Bello, MPATE-GE 2623 Music Information Retrieval, New York University, retrieved on Apr. 16, 2020 in PDF format from https://s18798.pcdn.co/jpbello/wp-content/uploads/sites/1691/2018/01/4-periodicity.pdf, which is herein incorporated in its entirety by this reference).

Figure 5A:
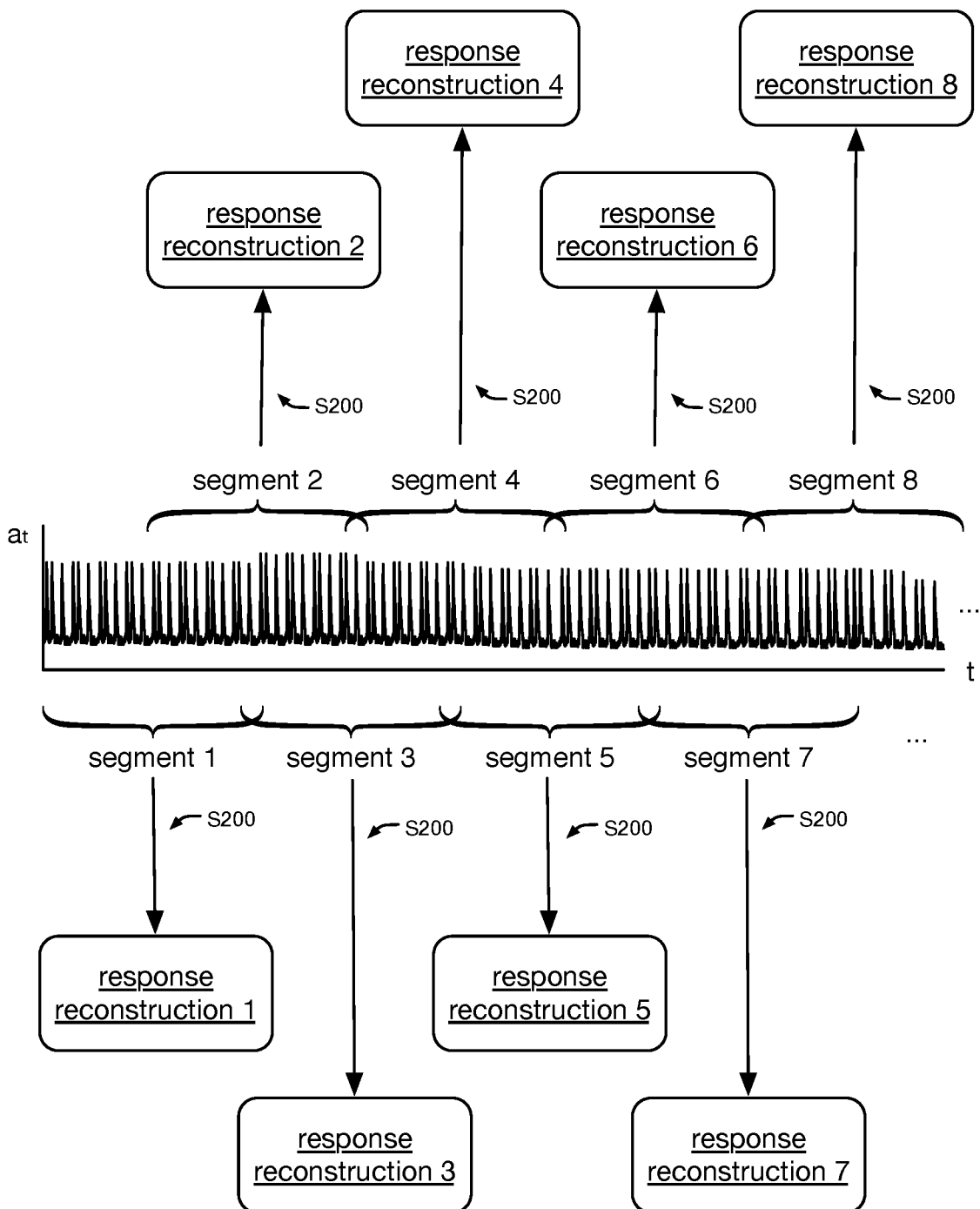
FIG. 5A depicts an example of determining a set of response reconstructions.

Multiple response reconstructions (e.g., and associated descriptive values) can be determined over time (e.g., each associated with a different time window of the input data), thereby defining a time series of response reconstructions (e.g., as shown by way of example in FIG. 5A). The input data time windows for the different response reconstructions can be overlapping, non-overlapping but adjacent, non-adjacent, and/or can have any other suitable temporal relationship. Each time window is preferably contiguous, but in alternate variations, one or more response reconstructions can be determined based on a combination of multiple non-contiguous time windows. The one or more generated response reconstructions can be used in S400 to determine latent features (e.g., determining a time series of latent feature values based on the time series of response reconstructions, such as wherein each response reconstruction is used to determine a single value of each associated latent feature) and/or to determine entity information in S500 (e.g., comparing response reconstructions, and/or the associated latent features, across a time series, between multiple similar entities, and/or between any other suitable entities associated with the data).

In a first variant, determining a response reconstruction can include: identifying one or more state change event occurrences in the entity data; determining an event data subset by sampling points of the entity data based on the state change event occurrences; and generating a response reconstruction using the event data subset, which can include: aligning the points of the event data subset and additionally or alternatively include post-processing the aligned points. In a first example, when the entity data includes one signal, the method can generate a one response reconstruction. In a second example, when the entity data includes M signals, the method can generate M response reconstructions, more than M (e.g., when one signal is used to generate multiple response reconstructions), less than M (e.g., when multiple signals are used to generate one response reconstruction), and/or any other suitable number of response reconstructions.

In a second variant, determining a response reconstruction can include: splitting the entity data into segments based on the entity replacement events; identifying one or more state change event occurrences in each segment; determining an event data subset by sampling points of the segment based on the state change event occurrences; and generating a response reconstruction using the event data subset, which can include: aligning the points of the event data subset and additionally or alternatively include post-processing the aligned points.

Figure 5B:
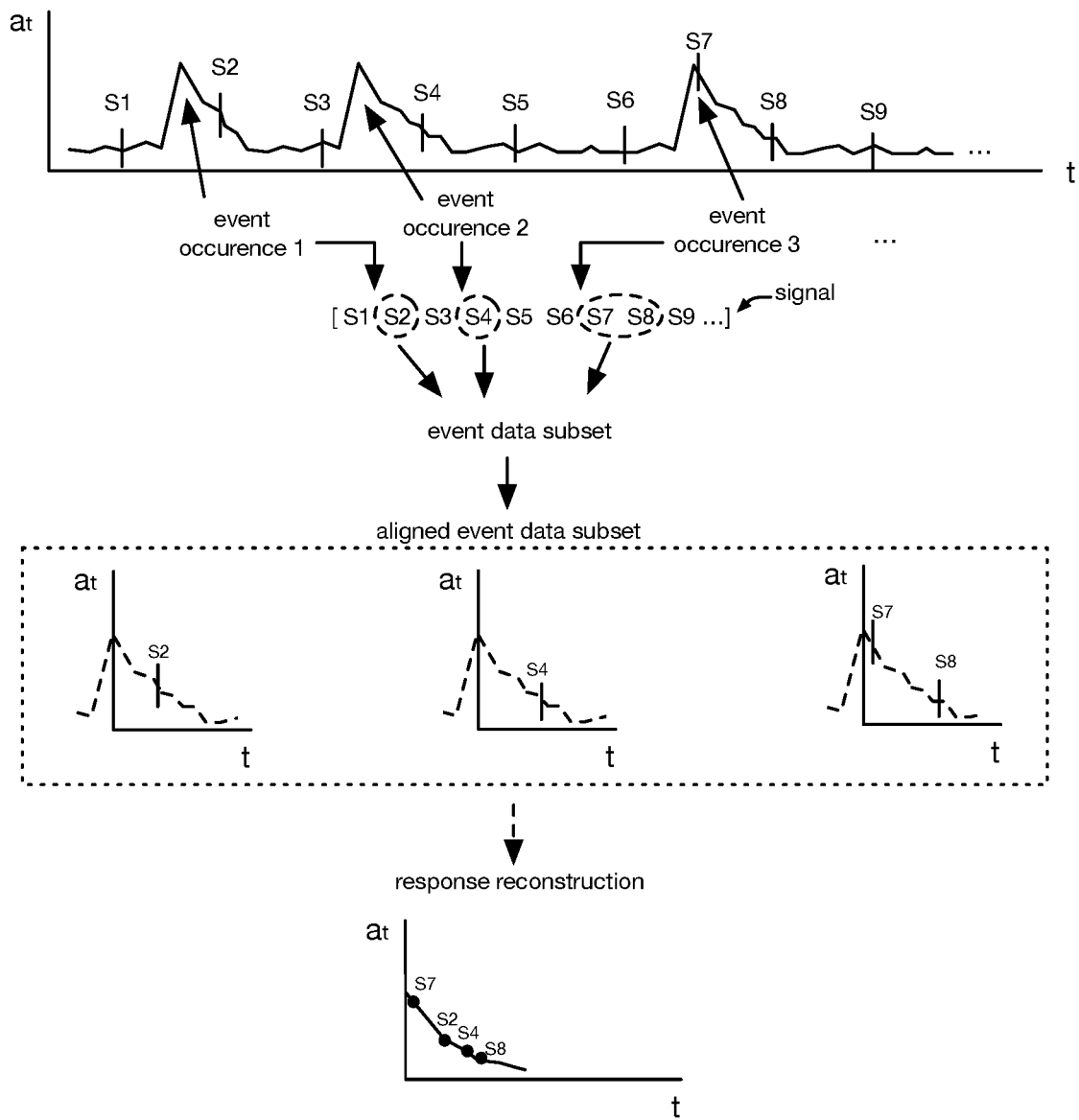
FIG. 5B depicts a specific example of determining a response reconstruction.

An example of determining a response reconstruction is depicted in FIG. 5B. Each S1, S2, S3, etc. are samples of the sensor that are included in a signal of the entity data (e.g., one segment of the signal, such as a segment selected as shown in FIG. 5A). The curve on which these samples are depicted represents the true behavior of the entity during that time, but at a much higher temporal resolution than that of the sampled signal (wherein the sampled signal resolution is shown by the space between the depicted samples S1, S2, S3, etc.) After each event occurrence, the next sample of the signal is added to an event data subset. The event data subset can be used to generate a response reconstruction, preferably by temporally aligning each sample of the event data subset (e.g., updating the times associated with each sample to its delay time, such that the event occurrence represents time 0). Accordingly, the generated response reconstruction can exhibit temporal resolution much greater than that of the sampled signal.

However, determining one or more response reconstructions can additionally or alternatively include any other suitable elements.

5.3 Determining a Processed Representation S300.

The method optionally includes determining a processed representation S300, which can function to determine a transformation of the entity data, the metadata, and/or any others suitable data, and/or perform any other suitable functionality.

Determining a processed representation is preferably performed per signal of the entity data, and/or per metadata associated with a particular signal, but can additionally or alternatively be performed using multiple signals and/or metadata associated with multiple signals (e.g., from the same entity, from different entities, etc.). The signals and/or metadata can be processed in parallel (e.g., for signals with replacement events that occur at the same time) and/or in series.

Determining a processed representation of the entity data can optionally include determining segments. In some examples, determining segments can be performed such as described in S200, but can additionally or alternatively be otherwise determined.

In some embodiments, determining a processed representation includes determining a response reconstruction such as described in S200.

In a first variant, when the entity data includes one signal and the metadata includes K replacement events, determining a data transformation can include determining K segments of the signal.

In a second variant, when the entity data includes M signals and the metadata associated with the first signal includes $K_1$ replacement events, metadata associated with the second signal includes $K_2$ replacement events, and so on, the determining a data transformation can include determining $K_1+K_2+\ldots+K_M$ segments. The segments from each of the M signals can be processed in parallel by S400 and/or in series.

In a third variant, one or more fields of the metadata can be used to determine a new field of the metadata. In a first example, a combination of events associated with a signal can be indicative of a new event. In a second example a combination of metadata fields (e.g., entity characteristics) can be indicative of a new field (e.g., similar entities).

In a fourth variant, a signal and/or a plurality of signals of the entity data can be used to determine a new field of the metadata (e.g., events; labels, such as outlier, sparse, dense, good, bad, etc.; etc.).

However, determining a processed representation of the entity data can additionally or alternatively include any other suitable elements.

5.4 Determining One or More Latent Features S400.

The method preferably includes determining one or more latent features S400, which can function to determine (e.g., using received data) features unobserved by the sensors, which can include response reconstructions, segments, any other processed representations, the entity data and/or any other suitable data. S400 can additionally or alternatively function to reduce the dimensionality of the received data and/or perform any other suitable functionality. Determining one or more latent features can be performed per segment, per signal, per response reconstruction, per multiple signals, segments, and/or response reconstructions, etc. Determining each latent feature can be performed for in parallel and/or in series. The one or more latent features preferably includes N latent features, wherein N can be the number of sensors M, the number of segments, the number of response reconstructions, less than M, greater than M, and/or any other suitable number.

As used herein, "latent feature" a latent property of the system and/or associated entities, and/or to a value or set of values associated with the latent property. The latent properties preferably include latent physical properties, wherein each latent physical property is preferably associated with a physical aspect of the system and/or associated entities. The latent properties are preferably numerically-valued (e.g., the latent features include numerical values of the associated latent properties) and continuous, more preferably being smooth and/or differentiable (e.g., with respect to time, with respect to other physical aspects of the system and/or associated entities, etc.). However, the system and/or method can additionally or alternatively include any other suitable latent features and/or latent properties.

In some embodiments, the latent features can be determined for the training data (e.g., training latent features) and/or for inference data (e.g., inference latent features).

The latent features preferably influence the entity due to real physics, but can alternatively not influence the entity due to real physics. The latent features satisfy one or more continuity laws, but can alternatively not satisfy continuity laws.

The latent features can include: decay time, overshoot, undershoot, damping parameter, motor load, work, "water hammer" metric (pressure waves), a delta between an estimated or predicted MFC orifice size and an expected MFC orifice size, responses, settling times, and/or any other suitable latent features. In embodiments in which the entities include one or more PCB assembly and/or inspection machines, the latent features can include, by way of examples, one or more of: velocity and/or acceleration (e.g., of component during ejection from nozzle, of component during nozzle motion, etc.), such as maximum or average velocity and/or acceleration; component placement accuracy and/or error tolerance (e.g., based on accuracy and lead pitch); solder pad temperature (e.g., temperature profile over time, such as determined based on time and temperature in oven, solder pad thermal mass, thermal conductivity profile of the PCB, etc.); and the like.

The latent features can be determined using physical modeling techniques to model one or more of the variables, but can additionally or alternatively be determined using feature extraction techniques (e.g., PCA, ICA, isomap, etc.). The physical model techniques can include physical simulation (e.g., based on one or more physics models, each of which preferably defines a physical relationship between a first set of one or more physical properties, such as some or all of the entity data, and a second of physical properties, such as some or all of the latent features), summary statistics (e.g., mean, median, maximum, minimum, etc.), weighted average, and/or any other suitable physical model technique.

Physical simulation can function to use input data (e.g., one or more signals or segments from substantially a single time point, such as sampled substantially concurrently; time series data from one or multiple signals or segments, one or multiple response reconstructions, etc.; any other suitable entity data, derivative data, and/or other input data; etc.) to simulate unobserved variables. For example, physical simulation can include, preferably based on a physics model (e.g., and based on the input data, such as entity data and/or response reconstructions) modeling a set of modeled data (e.g., modeled time series data), wherein the modeled data is preferably indicative of one or more latent features associated with the manufacturing system. The latent features determined using physical simulation can have the same physical quantity dimensions (e.g., base quantity dimensions such as length, mass, time, electric current, thermodynamic temperature, chemical amount, and/or luminous intensity; dimensions associated with derived quantities such as plane angle, solid angle, frequency, force, pressure, velocity, area, volume, acceleration, flow rate, voltage, power, etc.) as the input data, different dimensions, and/or the latent feature can be dimensionless. Physical simulations can include: heat flux models to model temperature; mass transport models to model pressure, species flux (e.g., species per unit area), etc.; mechanical force model such as to model work, load, stress, strain (e.g., determine Young's modulus using fit and strain data, calculate expected strain based on known modulus, geometry, and/or measured force, etc.); electrical models (e.g., determine resistance by fitting an current-voltage curve); curve fitting models (e.g., of time series) to determine decay time, overshoot, undershoot, damping parameter, etc.; material deposition models (e.g., simulating temperature, such as heat flow, cold spots, etc.; deposit locations; process gas flow presence; etc.), and/or any other suitable physical simulation.

In a first variant, determining one or more latent features can include simulating the entity operation to determine the latent features (e.g., using physical simulation techniques, such as analytical calculation, numerical calculation, finite element analysis, multi-physics simulation, etc.). Simulating the entity operation to determine the latent features can include selecting one or more physical simulations; determining one or more simulation hyperparameters for the selected physical simulation; running the physical simulation; identifying one or more latent features; and extracting the one or more latent features from the physical simulation, but can additionally or alternatively include any other suitable elements performed using any other suitable processes.

Selecting the one or more physical simulations can be based on the input data, one or more entity variables associated with the input data, the entity, one or more previously determined latent features, and/or any other suitable information. The one or more physical simulations can be selected using heuristics, rules, a selection algorithm, and/or any other suitable process.

Determining one or more simulation hyperparameters for the selected physical simulation can be based on physical constraints, entity operation constraints, and/or any other constraints; based on the entity data, the metadata, processed data, or any other data; and/or based on any other suitable information. The simulation hyperparameters can be retrieved from a simulation database, generated using heuristics, rules, algorithms, and/or determined using any other suitable technique.

Running the physical simulation can include using the simulation hyperparameters, the input data, and/or any other information to execute the physical simulation. The physical simulation can be run for a predetermined period (e.g., 1 minute, 10 minutes, 30 minutes, 1 hour, 2 hours, 5 hours, 1 day, 5 days, 20 days, until a replacement event, etc.), run until convergence (e.g., satisfaction of one or more convergence criteria), run until completion (e.g., completion of an analytical and/or numerical calculation representative of the simulation), and/or run for any other suitable interval of time.

In some examples, the latent features determined based on the physical simulation are not accurate estimates of actual physical parameters of the system; however, the latent features preferably exhibit a substantially monotonic relationship (and more preferably, a substantially linear relationship) with the true value of the corresponding actual physical parameter. For example, an average (e.g., weighted average) of a plurality of temperature measurements at different locations in an entity can be used to determine a latent feature associated with an unmeasured temperature at another location of the entity (in which no temperature measurement was obtained). In this example, although the latent feature may not be an accurate estimate of the unmeasured temperature, it preferably takes on higher values when the unmeasured temperature is high, and lower values when the unmeasured temperature is low. In a specific example, the latent feature is approximately equal to mT+b, wherein T is the unmeasured temperature, and m and b are constants.

Identifying one or more latent features can be performed based on the physical simulation, but can additionally or alternatively be predetermined (e.g., before running the physical simulation, before selecting the physical simulation, etc.). The one or more latent features can be identified using heuristics, rules, algorithms, and/or any other suitable technique.

Extracting the one or more latent features from the physical simulation can include exporting the values associated with the identified latent feature to a log file, sampling values with a virtual sensor, and/or otherwise extracting the one or more latent features from the physical simulation.

In a second variant, determining one or more latent features can include determining a series of windows and applying a summary statistic to each window. A window can represent a period of time (e.g., 5 days, 7 days, 10 days, 15 days, 30 days, 40 days, 50 days, etc.). Windows preferably overlap with adjacent windows (e.g., by 2 days, 3 days, 4 days, 5 days, 6 days, 7 days, 8 days, 9 days, 10 days, etc.), but can additionally or alternatively be contiguous and non-overlapping, be separated by time intervals not included in any window, and/or have any other suitable relationships. The window can additionally or alternatively be represented by seconds, minutes, hours, weeks, months, and/or any other suitable period of time.

In a first embodiment, determining one or more latent features can include: determining a series of windows for a signal with a predetermined window size and a predetermined window overlap; determining a summary value for each window using a summary statistic based on the values within the window to determine a latent feature of summary values for the signal; and repeating the process for each of the M signals (or a subset thereof) to determine the latent features.

In a first example, a latent feature can be a component displacement vector (e.g., of a component mounted to a circuit board). The component displacement vector can be compared to other displacement vectors (e.g., of different versions of the same component, such as identical or substantially identical components mounted to different copies of the same circuit board, wherein each component is intended to be placed in the same location of its respective circuit board) to determine a particular zone for the component (e.g., as described in S500). Additionally or alternatively, the component displacement vector can be compared to an average component displacement vector calculated from the other displacement vectors (e.g., to determine the particular zone for the component and/or board).

In a second example, a latent feature can be a response reconstruction associated with a particular entity and/or a vector of durations of each response reconstruction.

In a third example, the latent feature can be extracted from the response reconstruction (e.g., decay time, average value, etc.).

In a fourth example, the latent feature can be extracted from one or more physical simulations described above and/or any other physical simulation or model.

However, determining one or more latent features can additionally or alternatively include any other suitable elements.

5.5 Determining Entity Information S500.

The method preferably includes determining entity information (e.g., a maintenance state and/or process change state of one or more entities), which can function to compare information (e.g., latent features, response reconstructions, etc.) associated with different entities (e.g., comparing information associated with a first entity to information associated with a plurality of other entities), such as to determine a classification, a time horizon for operation, and/or any other operation information.

The entity information can include: a classification, such as a zone (or "region") label (e.g., safe zone, unsafe or risky zone, intermediate-risk zone, unknown zone or not within a known zone, etc.) such as shown by way of examples in FIGS. 7A-7B, score, etc.; a time horizon prediction until recommended maintenance, such as based on a hypervelocity (of a point representing one or more latent feature values) within a parameter space defined over one or more latent features (e.g., as described below regarding the parameter space defined by the subset of latent features), such as shown by way of example in FIG. 7C; an operation trendline (e.g., within a safe region, away from a safe region, toward an unsafe region, etc.); any other maintenance state (e.g., preventative maintenance recommended, time until expected failure and/or until preventative maintenance required for low-risk operation, recommended deferral of preventative maintenance, etc.) and/or information associated with determining a maintenance state; a process change state (e.g., process parameter change recommended, process parameter change not recommended, etc.); and/or any other suitable information. In some examples, "risky" can be understood to mean anything that is not within a safe zone.

Determining entity information can include selecting a subset of latent features (e.g., set of best latent features), which can function to reduce the one or more latent features to the set that achieves a predetermined classification accuracy, maintenance time horizon accuracy, determines a suitable operation trendline (e.g., suitable based on heuristics, rules, metrics, etc.), and/or any other latent features. The subset of latent features can be determined using heuristics, rules, algorithms, and/or any other suitable process. The subset of latent features (and/or any other suitable set of latent features) can define a parameter space (e.g., wherein each latent feature defines a dimension of the parameter space, such as wherein the parameter space is a vector space and each latent feature is associated with a different element of vectors within the space).

Determining entity information can include determining boundaries that function to separate one or more clusters (e.g., within the parameter space). The boundaries can be hypersurfaces (e.g., hyperplanes) and/or any other boundaries (e.g., as shown by way of example in FIGS. 7A-7C; although depicted herein as a two-dimensional space for graphical simplicity, a person of skill in the art will recognize that the parameter space, and accordingly the safe region, may have any suitable number of dimensions, each preferably corresponding to a different physical parameter and/or latent parameter). For example, the boundaries can delimit one or more clusters, each of which can define (e.g., occupy) a contiguous region (e.g., convex or substantially convex region, such as a hypersphere, hypercube, etc.). In a first example, a safe region within the parameter space is convex. In a second example, the parameter space is partitioned by a safe region and one or more unsafe (or "risky") regions, wherein the unsafe regions are preferably convex (e.g., and so the safe region represents all of the parameter space except for a set of convex unsafe regions). However, the regions can have any other suitable shapes.

The boundaries can be determined based on the set of best latent features, the one or more latent features, the response reconstructions, and/or any other suitable information. The boundaries can be determined using unsupervised learning (e.g., clustering techniques, such as k-means, mean shift, EM clustering using gaussian mixture models, etc.; neural networks, etc.), rules, heuristics, algorithms, and/or any other suitable process. Determining boundaries can include evaluating the boundaries using one or more boundary metrics (e.g., number of false positives, number of false negatives, accuracy of machine fail prediction, number of machine hours lost for flagging machine too early, number of failures caught and/or missed, etc.). Determining boundaries can include updating the boundaries based on the boundary metrics until one or more metrics satisfy a predetermined boundary metric threshold (e.g., threshold accuracy, threshold false positives, threshold false negatives, etc.).

Determining entity information can include determining one or more zones (e.g., safe, unsafe, intermediate, unknown, etc.), which can function to enable a comparison between the first entity latent features and the other plurality of entities latent features. The one or more zones are preferably determined using the boundaries, but can additionally or alternatively be determined using heuristics and/or any other suitable information. In a first example, unsafe zones can be determined by identifying unsafe zone hyperplanes using entity replacement events and determining that a particular zone defined by one or more hyperplanes is an unsafe zone and or points a predetermined distance from the boundary of the identified unsafe zone hyperplanes are associated with an unsafe zone. In a second example, safe zones can be associated with points a predetermined distance from a boundary of a zone not associated with replacement events (e.g., predetermined distance from a hyperplane, a predetermined distance from a region center, etc.). In a third example, intermediate zones can associated with points a predetermined distance from the boundaries.

Determining entity information can include determining an associated zone label for each entity by comparing the latent features associated with each entity to the defined zones. Entities can be associated with zone labels based on the location of the latent feature placement within the zone. In a first example, latent features that are positioned near a boundary can be labelled safe-intermediate or unsafe-intermediate based on the defined zone associated with the latent feature position. In a second example, latent features that are positioned a predetermined distance from the boundary can be labelled safe or unsafe based on the defined zone associated with the latent feature position.

In a first variant, when the entity data includes training and inference data, the training data and/or associated training latent features can be used to determine the zones and the inference data and/or inference latent features can be evaluated to determine machine information using the defined zones.

Determining entity information can optionally include determining a hyper-velocity of one or more latent features of an entity relative to the boundaries such as to determine a time horizon until recommended maintenance and/or an operation trendline, which can be used to determine the time horizon. A hyper-velocity can be determined by calculating the derivative of the one or more latent features, estimated based on the one or more latent features, and/or otherwise determined. In a first example, the operation trendline can be used to estimate when an entity is expected to be labelled unsafe.

Determining entity information can optionally include determining entity information using supervised learning such as using the above defined zones to label a training set of latent features, training a supervised classifier (e.g., regression, neural network, decision tree, etc.) using the training set, and determining a zone for one or more latent features not included in the training set using the supervised classifier.

In a first variant, when the entity data includes training and inference data, the training data and/or associated training latent features can be used to determine the supervised classifier and the inference data and/or inference latent features can be evaluated to determine machine information using the supervised classifier.

In a first example, determining entity information can include receiving an average component displacement vector as the latent feature determined from individual component displacements, and analyzing the velocity of an average component displacement vector over time to determine a safe zone, intermediate zone, and/or unsafe zone for that vector and/or to determine a zone label based on predefined zones associated with past average component displacement vectors. In a specific example, the component can be a surface mount device mounted to a circuit board and the average component displacement vector can represent the displacement of the component over time. In this example, a displacement vector outside or tending outside of the safe zone (and/or into an intermediate or unsafe zone) can result in flagging circuit boards for further inspection, reconfiguring the component placing equipment, and/or otherwise evaluating and/or correcting the undesired component displacement.

In second example, determining entity information can include analyzing one or more latent features extracted from the deposition models described above in S400, (e.g., such as to determine the extent and/or locations of deposition of undesired materials, which can be used for targeted cleaning, entity component replacement such as valve or manifold replacement, entity replacement, and/or any other entity maintenance).

In a third example, determining entity information can include determining valve settling time (e.g., from the response reconstructions determined in S200).

In a fourth example, determining entity information can include determining species flow through a mass flow controller (MFC), which can be used to diagnose and/or anticipate MFC behavior (e.g., determining that an MFC orifice is degraded, such as based on comparing measurements of a particular MFC performance to other MFC performance measurements).

Entity information can be transmitted to the entity itself for display, to a user device, to the entity database for retrieval by a user, and/or otherwise used by a user. Additionally or alternatively, the entity information is not transmitted (e.g., when the method is performed on the entity). The entity information can be transmitted using the communication system and/or any other suitable system.

5.6 Acting Based on Entity Information S600.

Acting based on entity information Shoo preferably functions to maintain and/or improve functioning of the system (and/or entities associated with the system) based on the information determined as described above (e.g., based on the entity information determined in S500, such as based on one or more determined maintenance states and/or process change states). For example, S600 can include performing maintenance (e.g., preventative maintenance) in response to determining that an entity may be at higher risk of failure (e.g., operating outside a safe region and/or within a risky region, such as dwelling outside the safe region and/or within the risky region for more than a threshold period of time; tending toward operation outside a safe region and/or within a risky region, such as projected to exit the safe region and/or enter the risky region within a threshold period of time; etc.), deferring maintenance (e.g., preventative maintenance) in response to determining that an entity may be at lower risk of failure (e.g., operating within a safe region and/or outside a risky region most or all of the time, not tending toward operation outside the safe region and/or within the risky region, temporarily operating outside the safe region and/or within the risky region but tending toward operation within the safe region and/or outside the risky region, etc.), recommending future performance of preventative maintenance (e.g., before a time at which entity operation is projected to be higher risk), and/or otherwise managing maintenance of one or more entities (e.g., based on the entity information). Additionally or alternatively, S600 can include determining and/or applying one or more process parameter changes, recommending one or more process parameters for possible change and/or for investigation of potential need for change, and/or otherwise acting to alter (or not alter) process parameters.

In examples, S600 can include repairing one or more entities, replacing one or more entities and/or elements thereof, and/or performing any other suitable maintenance.

S600 is preferably performed in response to determining information associated with maintenance (e.g., performing maintenance in response to determining that maintenance is recommended and/or required) and/or process parameters, such as in response to determining a maintenance state and/or process change state. However, S600 can additionally or alternatively be performed with any other suitable timing.

However, S600 can additionally or alternatively include taking any other suitable action based on entity data in any other suitable manner.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for predictive maintenance, comprising:
    sampling time series data indicative of a plurality of physical properties associated with operation of a manufacturing system;
    based on the time series data and a physics model, modeling a set of modeled time series data indicative of latent properties associated with the manufacturing system, wherein the physics model defines a physical relationship between the plurality of physical properties and the latent properties;
    determining, within a latent property parameter space, a safe operation region, wherein the latent property parameter space is defined over the latent properties;
    based on the modeled time series data, predicting that the manufacturing system will operate outside the safe operation region, wherein operation outside the safe operation region is associated with failure of at least one component of a set of components of the manufacturing system, wherein predicting that the manufacturing system will operate outside the safe operation region comprises:
        based on the modeled time series data, determining a hyper-velocity, within the latent property parameter space, of a point representative of manufacturing system operation; and
        based on the hyper-velocity, predicting a time at which the point will cross a boundary of the safe operation region; and
    in response to predicting that the manufacturing system will operate outside the safe operation region, performing a preventative maintenance process on the set of components, comprising at least one of repairing or replacing a first component of the set of components.

2. The method of claim 1, wherein performing preventative maintenance on the manufacturing system is performed before the time.

3. The method of claim 1, wherein each of the latent properties is continuous and differentiable.

4. The method of claim 1, wherein determining the safe operation region is performed based on the set of modeled time series data.

5. The method of claim 4, wherein determining the safe operation region is performed based further on historical data associated with manufacturing system failure.

6. The method of claim 1, wherein each of the latent properties is continuous.

7. The method of claim 1, wherein the plurality of physical properties comprises a component lateral displacement.

8. The method of claim 1, wherein the plurality of physical properties comprises an oven temperature and a heating time.

9. The method of claim 8, wherein the latent properties comprise a component temperature.

10. The method of claim 1, wherein the safe operation region is convex.

11. The method of claim 1, wherein the latent property parameter space is partitioned by the safe operation region and a set of unsafe operation regions, wherein each unsafe operation region of the set is convex.

12. The method of claim 1, further comprising, based on the time series data, determining a set of response reconstructions associated with one or more physical properties of the plurality, wherein modeling the set of modeled time series data is performed based on the set of response reconstructions.

13. The method of claim 12, wherein determining the set of response reconstructions comprises:
    determining the presence of a motif in the time-dependent behavior of the one or more physical properties;
    from each of a sequence of occurrences of the motif, sampling a respective measurement; and
    aggregating the respective measurements to define a response reconstruction of the set.

14. The method of claim 12, wherein determining a response reconstruction of the set comprises computing a kernel density over a temporal subset of the time series data.

15. The method of claim 12, wherein:
- within a temporal subset of the time series data, the time-dependent behavior of the one or more physical properties is periodic; and
- determining a response reconstruction of the set comprises:
  - selecting, from the temporal subset, single-cycle subsets associated with each of a plurality of cycles;
  - determining a cycle start timing offset based on auto-correlation of the temporal subset, wherein the cycle start timing offset maximizes cross-correlation between the single-cycle subsets; and
  - based on the cycle start timing offset, combining the single-cycle subsets to generate an average cycle representation.

16. The method of claim 1, wherein the set of components consists of the first component.

17. The method of claim 1, wherein performing the preventative maintenance process on the set of components comprises replacing the first component.

* * * * *